Sept. 27, 1949.  F. H. KOON  2,483,012
FISHING ROD HOLDER
Filed Nov. 23, 1945  2 Sheets-Sheet 1
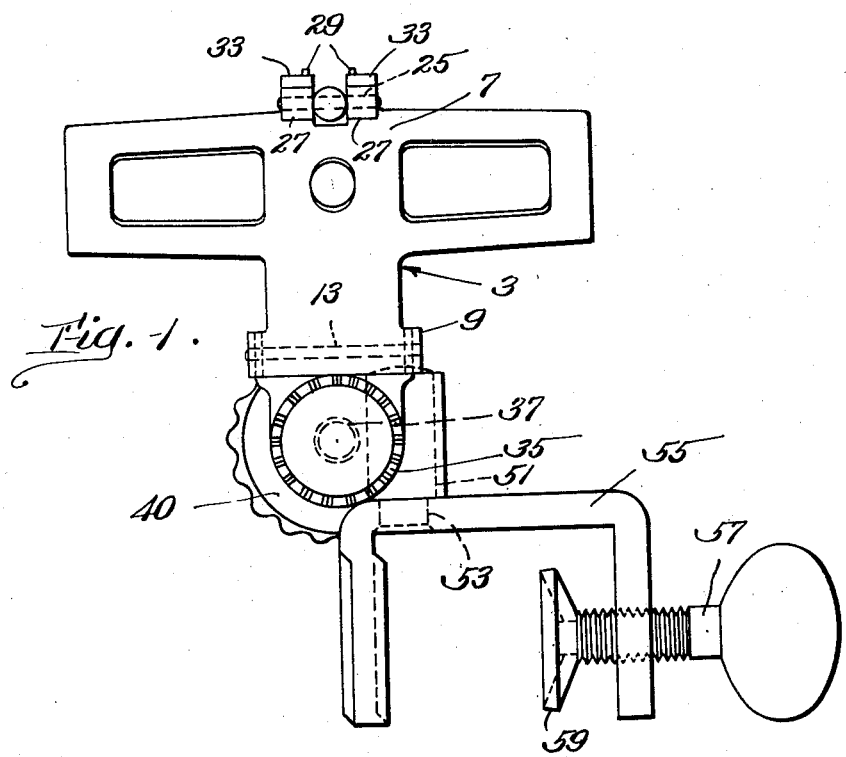
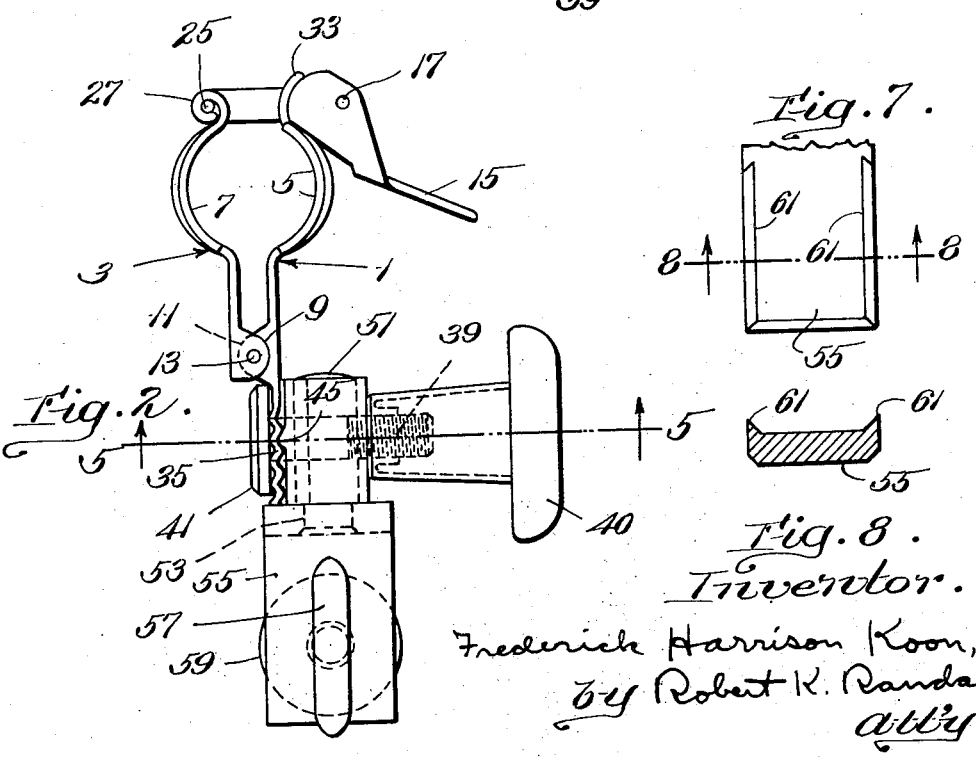
Inventor.
Frederick Harrison Koon,
by Robert K. Randall,
att'y.

Sept. 27, 1949.  F. H. KOON  2,483,012
FISHING ROD HOLDER
Filed Nov. 23, 1945  2 Sheets-Sheet 2
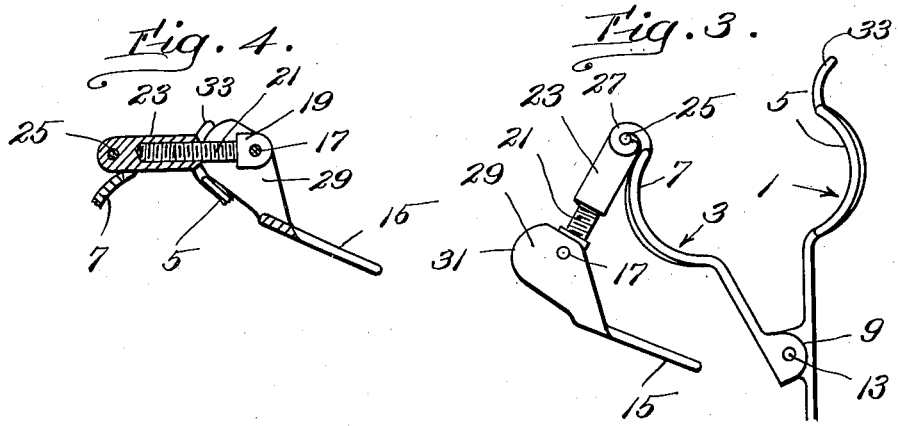
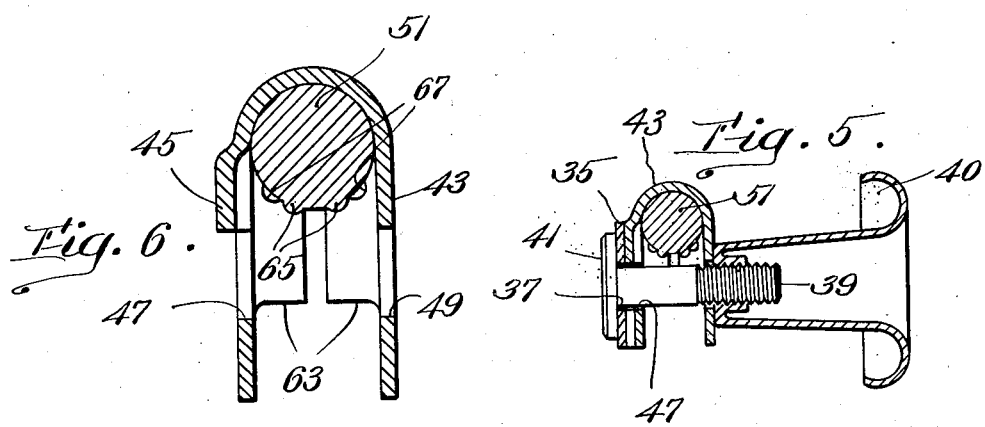
Inventor
Frederick Harrison Koon,
by Robert K. Randall,
atty.

Patented Sept. 27, 1949

2,483,012

UNITED STATES PATENT OFFICE 2,483,012

FISHING ROD HOLDER

Frederick Harrison Koon, Charlestown, N. H.

Application November 23, 1945, Serial No. 630,208

2 Claims. (Cl. 248—42)

This invention relates to devices to be temporarily attached to a part of a boat or other support for holding fishing rods when in use for trolling or still fishing, and has as its object to provide an improved fishing rod holder of simple and compact design, which will positively clamp rods of various diameter against escape and loss overboard, and yet will permit instantaneous release of the rod for unhampered handling in playing and landing a fish.

A further object of the invention is to provide a rod holder which will hold a fishing rod at any desired horizontal or vertical angle, or combinations of these angles, regardless of the disposition or direction of extent of the surface to which the holder is affixed, and an additional aim is to provide clamping means for affixing the holder to such surface firmly and immovably in use but with capacity for quick and easy attachment and removal.

A variety of fishing rod holders have been proposed heretofore, none of which to my knowledge completely satisfies the requirements met with in use. Of these, the commonest type comprising one erect and one inverted U-shaped holding members to engage the rod butt in spaced relation lengthwise of the rod, actually constituted merely a rest for the rod, and gave no substantial assurance against escape and loss of the rod under a severe pull on the line or in case the rod were tipped upward through contact with an oar or tree branch or otherwise, or through accidental contact with the rod butt when the user is moving about in the boat. In other devices which sought to remedy this drawback by clamping the rod frictionally, the clamp devices were either springs or operated by springs, which gave only a yielding holding action instead of a positive locking of the rod in the holder, with the result that accidental escape and loss of the rod still occurred. Those devices which undertook to grip the rod positively to prevent all accidental escape involved inconveniences both through lacking or impeding the speedy release of the rod for handling when a fish is hooked, and through being incapable of fitting rods whose diameter varied to any material degree from the exact diameter for which the devices were built. In addition, many of these prior devices lacked provision for adjustment of the direction of extent of the rod held by them into all desired horizontal angles and elevations with respect to the supporting surface, thus impairing their utility.

With the aim of providing a rod holder overcoming all of these drawbacks, while providing a structure which can be simply, easily, and cheaply constructed, and one which will be light and durable but long-lived in use, I have devised the novel rod holder shown and described in the accompanying drawings and description.

An illustrative embodiment of the invention is shown in the accompanying drawings, in which Fig. 1 is a side elevation, Fig. 2 an end elevation, Fig. 3 an end view of the rod-clamping members, Fig. 4 a part-sectional detail of the actuating means for the rod-clamping members, Fig. 5 a section on line 5—5 of Fig. 2, and Fig. 6 an enlarged view of certain of the parts of Fig. 5. Fig. 7 is a face view of a portion of the clamp whereby the holder is attached to a supporting surface, Fig. 8 being a section on line 8—8 of Fig. 7.

The new device comprises a pair of cooperating rod-clamping members 1, 3, preferably formed of sheet metal stampings, each of which has a portion 5, 7, of segmental shape in section which grips the rod. Since the device is intended primarily to engage and hold the customary double-tapered cork grip of the rod, the concavity of the inward surface of each laterally prolonged portion 5, 7, is similarly shaped or tapered to receive the greatest diameter of the rod grip at midlength of the portions 5, 7, and the lessened diameter of the rod grip at each extremity of these portions 5, 7. Rod-clamp 3 is pivotally connected to the other clamping member 1 by means of mating ears 9, 11, and pivot pin 13 therethrough.

The means for clamping the rod-clamps 1, 3, about the rod comprise a finger lever 15 pivoted by a pin 17 to the head 19, Fig. 4, of a screw 21 threaded into an internally threaded member 23 which is pivotally mounted by pin 25 between two ears 27 integrally formed on rod-clamp 3. Finger lever 15 comprises two wings 29 and an integral portion connecting them, the whole being formed of one piece of sheet metal and the wings 29 being bent up into spaced and parallel relation with each other to lie in planes at right angles to that of the intervening connecting portion, which is prolonged to form the part engaged by the user's finger in clamping and unclamping the rod. The ends of wings 29 are curved to form cam surfaces 31, Fig. 3, these surfaces on the wings 29 hooking over and engaging with the outward surfaces of upwardly and outwardly curving lugs 33 formed on the top margin of rod-clamp 1 and spaced apart far enough to admit the end of internally threaded member 23 therebetween.

Through this construction, with the rod-clamps 1, 3, in open relation and the finger lever 15 with its connected part swung back, as shown in Fig. 3, the rod grip is inserted between the two concave portions 5, 7, these portions are manually closed upon the rod grip, the finger lever assembly is swung back over the rod to enter the member 23 or the screw 21 between the lugs 33, with the finger lever 15 and its wings oriented as shown in Fig. 4, and the finger lever then depressed to bring the parts into the relation shown in Figs. 2 and 4, whereby the cam action of surfaces 31 against lugs 33 draws the two jaws together to clamp the rod grip tightly and positively between them. If the rod grip is not gripped tightly enough, owing to its size, the finger lever and its assembled parts are lifted sufficiently to clear the lugs 33 and rotated to screw the screw 21 further into the member 23, thus shortening the distance between the centers 17 and 25, and cam surfaces 31 again brought into contact with the outward surfaces of lugs 33 and the finger lever depressed into the locked relation of Fig. 4, drawing the upper ends of rod-clamps 1 and 3 closer together to effect a satisfactory clamping of the rod grip. As is obvious, the screw 21 is unscrewed to accommodate rod grips of greater diameter, this simple adjustment making possible the satisfactory use of the device on rods having a wide range of diameters at the points in the length thereof desired to be gripped. The shaping of the cam surfaces on the finger lever and the clamp 1 is so related to the location of pivot 17 that the whole constitutes a powerful and positive toggle linkage which stays locked until the finger lever is again lifted.

Because the extent of the rod clamps 1, 3, is considerably less than the length of the rod grip, there is a sufficient length of such rod grip exposed at either or both ends of the rod clamps to permit the hand of the user to get a secure hold on the rod grip and at the same time to flip the finger lever 15 upward with a finger of the same hand to throw such lever and its assembled parts clear across the rod and into approximately the position of Fig. 3. Thus with practically a single motion of one hand the rod grip is seized and released from the clamps 1, 3, and instantaneously withdrawn from the holder in order to play a hooked fish, with no need for the assistance of the other hand or any undesirable endwise, lateral, or downward movement of the rod with attendant risk of slackening the line and losing the fish. The only motion involved is the natural and proper lifting of the rod and its tip regularly employed to set the hook and start the fish toward the boat, and this can be accomplished without the slightest delay, the fore finger of the user's hand striking and tripping the finger lever as he starts to lift up on the rod butt and this finger closing about the rod grip as the latter rises free from the rod clamps. At the same time accidental escape of the rod with resulting loss thereof is practically impossible.

To enable the rod holder to be quickly and easily attached to the seat, gunwale or other suitable part of the boat, and to provide for holding the rod at any desired horizontal or vertical angle or combination of these angles, the shank of the rod clamp 1 is extended down beyond the pivot pin 13 and the ears 11 holding the latter, and this extension is provided with a circular series of indentations or serrations 35 concentrically disposed about a central hole 37 through which passes a screw 39 equipped with a hand-nut or knob 40, and having a large flat head 41 which bears against one side of the serrated extremity of rod clamp 1 to press the other side of this serrated portion against one face of a generally U-shaped clamp member 43, Fig. 6. This side of member 43 has a single tooth 45 struck up from the surface thereof in radial relation to one of two holes 47, 49, through the two wings of this U-shaped member, such tooth engaging between successive serrations 35 on the end of rod clamp 1 as shown in Fig. 2, thus holding rod clamps 1 and 3 at any desired vertical angle about the axis of screw 39. The U-shaped member 43 is mounted upon a post 51 having its reduced lower end 53 put through and headed over and thus fixed in a hole in a clamping bracket 55 of generally C-clamp shape adapted to be fixed to the seat, gunwale, or other part of the boat. This bracket is provided with the usual thumb screw 57 threaded through one end and equipped with a swivel 59 to bear against one side of the supporting surface, while the opposing jaw of the bracket has its lateral edges struck down as indicated in Figs. 1, 7 and 8 in a direction toward the swivel, thus to provide sharp edges 61 to cut into the wood of the seat or other part and prevent rocking of the bracket about the axis of screw 57.

To provide for adjustment of the rod clamps 1, 3, about the post 51, to adjust the horizontal angle of the rod with respect to the boat, and to fix this adjustment positively after it has been attained without reliance solely on the frictional grip of U-shaped member 43 on post 51, the member 43 is equipped at its top and bottom ends with inturned wings 63, formed integrally with the side portions of the U-shaped member, two on each side portion, those at the top of member 43 being bent into a common plane substantially level with the top edge of member 43, and those at the bottom being folded into a common plane level with the bottom edge of this member. The margins of these wings 63 which are toward the bend of the U and thus are presented to the surface of the post 51 occupying the bend of the U, as shown in Fig. 6, are cut to conform, as does the bottom of the U, to the curve of the circular portion of the surface of post 51. The edges of the four wings, combined with the semi-circular inward surface of the U bend in member 43, thus define the passage through which post 51 extends.

To provide positive locking of member 43 and thus of the rod clamps 1, 3, against rotation about post 51, the latter is not truly cylindrical, but is formed with two axially extending ridges or keys 65 which are received in corresponding depressions or ways 67 cut in the otherwise circular margins of wings 63. Thus with the projections 65 occupying certain of these depressions 67, and with hand-nut 40 tightened to clamp the U-shaped member 43 about post 51 and serrations 35 against one side of member 43 with tooth 45 lying between a pair of such serrations, the rod clamps 1, 3, are locked against change of the vertical angle of the clamps 1, 3, with respect to the U-shaped member 43, or change of the horizontal angle of the clamps and member 43 about the axis of post 51 and thus with respect to the bracket 55 and the seat or other part of the boat to which the latter is affixed. These ribs or keys 65 are interrupted for a short space at a slight distance above their termination at the bottom of the full-diameter portion of post 51, so that to change the horizontal angle of the rod with respect to the boat it is only necessary to slacken the knob 40 enough to relax the grip of member 43 upon post 51, and thereafter slide member 43 upward slightly on post 51 until the lower wings 63 reach the level of the interruptions in ribs 65 and upper wings 63 pass off from the top of post 51, whereupon member 43 and the rod clamps 1, 3, are shifted angularly about the axis of post 51 to let the ribs 65 enter other notches 67 than those in which they originally stood, the member 43 being then again lowered until it rests on the top surface of bracket 55, and knob 40 again tightened to maintain this adjusted position. It is to be noted that the space purposely left between the opposing parallel edges of wings 63 serves just as do the notches 67 to receive one of the ribs or keys 65 in certain positions of adjustment. Any desired number of the notches 67 may be provided in the margins of wings 65, to give the wanted scope of adjustment to the horizontal angle of the rod. As is obvious, the post may alternatively be made polygonal in section, with the contacting portions of the member 43 of conforming shape, to gain the same result.

The foregoing construction thus provides full horizontal and vertical adjustment of the angle of the rod with respect to the boat, within its scope, and also independent adjustment of either the horizontal or vertical angle without change of the other angle, while affording positive locking of the rod in the holder and of the angular adjustment of the rod, yet still providing instantaneous release of the rod for free manipulation in playing and landing the fish.

While I have illustrated and described a certain form in which the invention may be embodied, I am aware that many modifications may be made therein by any person skilled in the art, without departing from the scope of the invention as expressed in the claims. Therefore, I do not wish to be limited to the particular form shown, or to the details of construction thereof, but what I do claim is:

1. A fishing rod holder having in combination opposed rod-clamping jaws pivotally connected below the rod, a cam linked to one jaw and swinging over the rod to engage the other jaw and draw both jaws together to clamp the rod between them, one of such jaws having a serrated extension, a bracket for attachment to a portion of a boat or other support, a post fixed on such bracket, a clamp surrounding such post, a serration upon one surface of such clamp, and screw means pressing the serrated extension on the jaw against such surface of the clamp and closing the clamp upon the post.

2. A fishing rod holder having in combination opposed rod-clamping jaws pivotally connected below the rod, a cam linked to one jaw and swinging over the rod to engage the other jaw and draw both jaws together to clamp the rod between them, one of such jaws having a serrated extension, a bracket for attachment to a portion of a boat or other support, a post fixed on such bracket, a clamp surrounding such post, a serration upon one surface of such clamp, and screw means pressing the serrated extension on the jaw against such surface of the clamp and closing the clamp upon the post, and means keying the clamp to the post so as to prevent relative rotation about the axis of the post.

FREDERICK HARRISON KOON.

REFERENCES CITED

The following references are of record in the file of this patent:

UNITED STATES PATENTS

| Number | Name | Date |
|---|---|---|
| 209,187 | Patterson | Oct. 22, 1878 |
| 947,282 | Hall | Jan. 25, 1910 |
| 1,760,458 | Weber | May 27, 1930 |
| 2,029,707 | Dodelin | Feb. 4, 1936 |
| 2,130,650 | Peterson | Sept. 20, 1938 |